No. 719,105. PATENTED JAN. 27, 1903.
H. D. GARDY.
COMBINED PAN LIFTER, CAN OPENER, AND CORKSCREW.
APPLICATION FILED MAY 19, 1902.
NO MODEL.
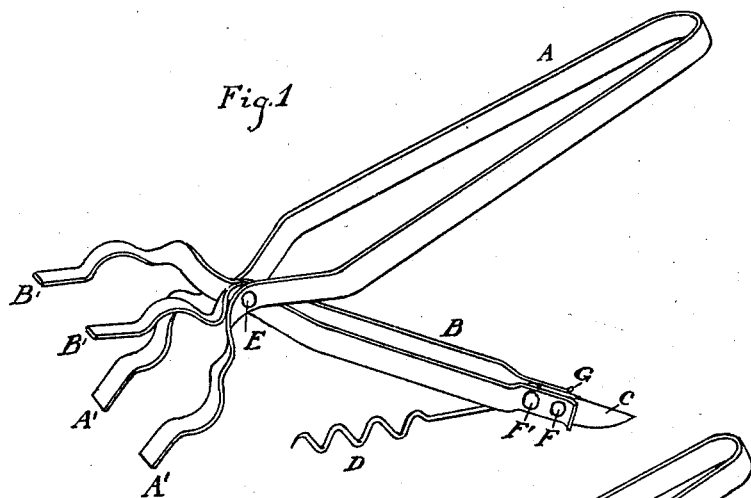
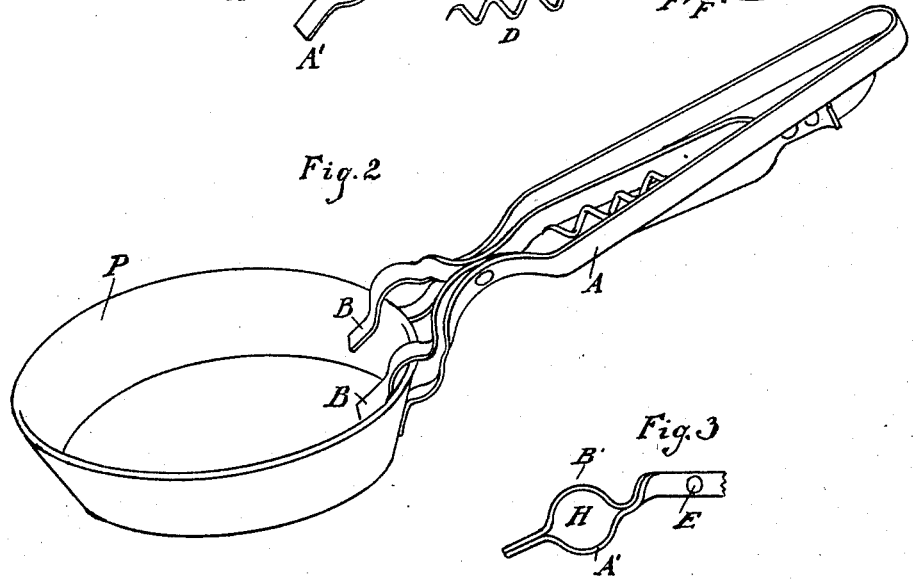
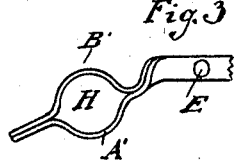
WITNESSES
INVENTOR
HENRY D. GARDY

United States Patent Office.

HENRY DANIEL GARDY, OF PHILADELPHIA, PENNSYLVANIA.

COMBINED PAN-LIFTER, CAN-OPENER, AND CORKSCREW.

SPECIFICATION forming part of Letters Patent No. 719,105, dated January 27, 1903.

Application filed May 19, 1902. Serial No. 108,100. (No model.)

*To all whom it may concern:*

Be it known that I, HENRY DANIEL GARDY, a citizen of the United States, residing at Philadelphia, State of Pennsylvania, have invented certain new and useful Improvements in a Kitchen Implement Combining a Pan-Lifter, Can-Opener, and Corkscrew, of which the following is a specification.

My invention relates, primarily, to the construction of a device or tool for grasping the edges or rims of pots, pans, plates, covers, and other kitchen utensils and lifting and carrying them, particularly when they are too hot for the hand, in a rigid and firm manner without any danger of tilting or slipping. Devices of this character have hitherto more or less failed in this important respect, and the contents of vessels carried by them have frequently been spilled. My invention has as one of its objects the complete avoidance of this fault.

Another object of my invention is the insertion in the handle of the pan-lifter at a point where it is not in the way of a can-opener, and another object is the placing of a corkscrew within one of the said handles. The combination of these useful and necessary tools in one implement makes my invention a very valuable kitchen device.

Describing my invention, reference is made to the accompanying sheet of drawings, in which—

Figure 1 is a side elevation of the implement embodying the several features of the invention. Fig. 2 is a view showing said implement grasping a pan, the implement being closed, which shows its compactness. Fig. 3 is a side elevation of the jaws of said implement with particular reference to the enlargement therein to form the opening H.

With regard to the details of said implement it will be seen by reference to the drawings that the main feature of the same is a pair of tongs, which consists of two members pivoted at E. One of the said members (designated by A) is made of one continuous piece of metal, preferably flat, bent back upon itself in the same plane to form two parallel sides having sufficient space between them to receive and house the member B when said tongs are closed. The member B is also constructed of the same material, with a space between the two parallel sides thereof to receive within same the corkscrew D. The two parallel sides of the member B are formed of two separate pieces of metal, which are riveted together at F and F'. When or before said sides are in this manner joined, their ends are flared out, as at G and G', to form a stop and fulcrum for the blade C. The ends of the blade C and of the corkscrew D are each properly formed and adapted for the purpose of being inserted between the said ends of the member B before the rivets F and F' are closed. C is rigidly held between said ends, while D is free to be moved in and out of the space between the parallel sides of the member B—that is to say, the corkscrew D may be either opened or shut, as desired. C is a sharp-pointed blade of steel and is preferably used as a can-opener, it being adapted to be employed for that purpose in the usual manner. The said hollow portions of the members A and B constitute the handles of said tongs. Where said members are joined at the rivet E, they are compressed to touch each other and yet have freedom of motion and play around said rivet sufficiently to allow of their being opened and shut. Beyond said rivet E each of said members expands into the grasping-jaws A' and B'. There are two pairs of these jaws—that is to say, each pair of jaws is formed by the two ends of A and B, each two ends making one pair of jaws. The shanks of said jaws or the portions between them and the rivet E are spread apart to make a space between them in order that two points of contact in the same plane, but separated from each other, may be provided to prevent any slipping and tilting of the pan, pot, plate, or other article grasped by said tongs. As pans, pots, and such kitchen utensils are usually made with a bead or raised rim around their edges, said jaws A' and B' are each correspondingly and oppositely expanded, as shown in Fig. 3, to form the hollow H. The object of this is to provide a recess in said jaws for said beads or rims or the thickened edges of such articles as said tongs are intended and adapted to lift and carry.

The operation of said implement in its principal use is best shown by reference to Fig. 2, where it is exhibited as grasping a pan P. The implement is closed, all the parts of same being housed within the member A. When it is to be used as a can-opener, the member B is turned until it is at right angles to the member A, which in this position constitutes a handle, (the corkscrew is housed within the member B,) and the blade C is thrust into the material to be cut as far as the stop G, and then the usual action to cut the metal of the can is made, G acting as a fulcrum. When the corkscrew is to be used, B is housed within A and the corkscrew D extended till it comes to a right angle with A, which acts as a handle, and this tool is then ready for its work.

Having now described my invention, what I claim is—

The within-described kitchen implement consisting of two opposite handle members pivoted together at E, one of the said members A acting as the containing-case of the implement, said member being formed of a single bar of thin metal bent back upon itself to form two parallel sides with a space between them up to the pivot E, the two ends of said member beyond said pivot being expanded into the lower halves A' and A' of two pairs of grasping-jaws, the other handle member B lying closely within said containing member A, and having a space between its parallel sides to receive and house the corkscrew D, and its two ends beyond the pivot E being expanded into the upper halves B' and B' of the said two pairs of grasping-jaws, the opposite ends of said member B being riveted together at F and F' and flared to form a stop and fulcrum G for the blade C, substantially as illustrated and described.

HENRY DANIEL GARDY.

Witnesses:
WM. WAGNER, Jr.,
CLARENCE C. GARDY.